United States Patent
Jaccoud et al.

(10) Patent No.: US 12,420,794 B2
(45) Date of Patent: Sep. 23, 2025

(54) HYBRID VEHICLE SPEED AND TORQUE CONTROL

(71) Applicant: JAGUAR LAND ROVER LIMITED, Coventry (GB)

(72) Inventors: Rodolfo Oliveira Jaccoud, Leamington Spa (GB); Matthew Hancock, Rugby (GB); Olivier Jean Brice Roques, Banbury (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 460 days.

(21) Appl. No.: 17/791,717

(22) PCT Filed: Jan. 10, 2021

(86) PCT No.: PCT/EP2021/050320
§ 371 (c)(1),
(2) Date: Jul. 8, 2022

(87) PCT Pub. No.: WO2021/140234
PCT Pub. Date: Jul. 15, 2021

(65) Prior Publication Data
US 2023/0046357 A1    Feb. 16, 2023

(30) Foreign Application Priority Data
Jan. 9, 2020  (GB) .................................. 2000312

(51) Int. Cl.
*B60W 10/08*      (2006.01)
*B60K 17/356*     (2006.01)
(Continued)

(52) U.S. Cl.
CPC ...... *B60W 30/18063* (2013.01); *B60W 10/06* (2013.01); *B60W 10/08* (2013.01);
(Continued)

(58) Field of Classification Search
CPC .......... B60W 30/18063; B60W 10/06; B60W 10/08; B60W 20/10; B60W 2520/10;
(Continued)

(56) References Cited

U.S. PATENT DOCUMENTS

2001/0035049 A1   11/2001   Balch et al.
2003/0034188 A1   2/2003    Gotou
(Continued)

FOREIGN PATENT DOCUMENTS

| | | |
|---|---|---|
| JP | 2003061207 A | 2/2003 |
| JP | 2006101644 A | 4/2006 |

(Continued)

OTHER PUBLICATIONS

English translation of Japanese Notification of reasons for refusal corresponding to application 2022-542297, dated Aug. 4, 2023, 4 pages.
(Continued)

*Primary Examiner* — Daniel M. Robert
(74) *Attorney, Agent, or Firm* — Troutman Pepper Locke LLP; Dustin B. Weeks; Nicholas H. Doss

(57) ABSTRACT

Aspects of the present invention relate to a method and to a control system for controlling an electric traction motor of a vehicle, the control system comprising one or more controllers, wherein the control system is configured to: limit a rate of change of torque requested from the electric traction motor for changing speed towards a speed target, in dependence on a lash crossing protection rate limiter; and upon removal of the limit prior to the speed reaching the speed target, inhibit initial increase of a torque requested from the electric traction motor for changing speed towards the speed target.

19 Claims, 3 Drawing Sheets

(51) Int. Cl.
    *B60W 10/06*     (2006.01)
    *B60W 20/10*     (2016.01)
    *B60W 30/18*     (2012.01)

(52) U.S. Cl.
    CPC ........... *B60W 20/10* (2013.01); *B60K 17/356* (2013.01); *B60W 2520/10* (2013.01); *B60W 2710/085* (2013.01); *B60W 2720/10* (2013.01)

(58) Field of Classification Search
    CPC ....... B60W 2710/085; B60W 2720/10; B60W 30/188; B60W 50/12; B60K 17/356; B60L 3/08; B60L 2240/40; B60L 2240/423; B60L 2240/443; B60L 15/2063; Y02T 10/62
    See application file for complete search history.

(56) References Cited

U.S. PATENT DOCUMENTS

| | | | |
|---|---|---|---|
| 2003/0225501 | A1 | 12/2003 | De La Salle et al. |
| 2008/0190675 | A1* | 8/2008 | Itoh ........................ B60W 10/02 180/243 |
| 2010/0114424 | A1* | 5/2010 | Morris ..................... F16H 59/68 701/51 |
| 2013/0297111 | A1 | 11/2013 | Yamazaki et al. |
| 2014/0288758 | A1* | 9/2014 | Suzuki ................ B60L 15/2009 701/22 |
| 2017/0327102 | A1* | 11/2017 | Yamazaki ............. F02D 41/107 |
| 2018/0237023 | A1* | 8/2018 | Orita ..................... B60W 30/20 |
| 2019/0054913 | A1* | 2/2019 | Lad ........................ B60W 20/00 |
| 2019/0137361 | A1 | 5/2019 | Akiyama |
| 2019/0329785 | A1 | 10/2019 | Farmer et al. |
| 2023/0046357 | A1* | 2/2023 | Jaccoud ................ B60W 10/06 |

FOREIGN PATENT DOCUMENTS

| | | | | |
|---|---|---|---|---|
| JP | | 2012091581 A | 5/2012 | |
| JP | | 2017159719 A | 9/2017 | |
| WO | WO-2013081121 A1 * | | 6/2013 | ............... B60K 6/44 |

OTHER PUBLICATIONS

Combined Search and Examination report corresponding to Great Britain Application No. GB2206418.2, Jul. 13, 2020, 6 pages.

International Search Report corresponding to International Application No. PCT/EP2021/050320, dated Apr. 23, 2021, 5 pages.

Written Opinion corresponding to International Application No. PCT/EP2021/050320, dated Apr. 23, 2021, 12 pages.

Chinese Office Action corresponding to application 202180008286.6, dated Feb. 22, 2025, 17 pages.

\* cited by examiner

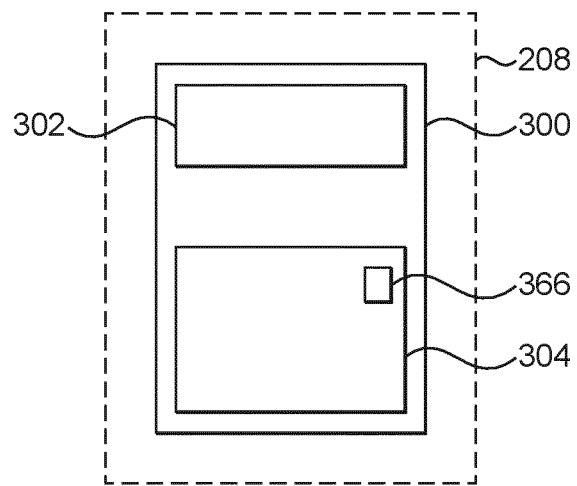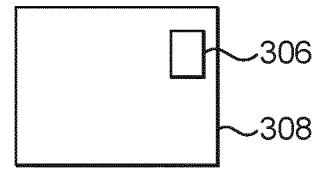
FIG. 3A                FIG. 3B
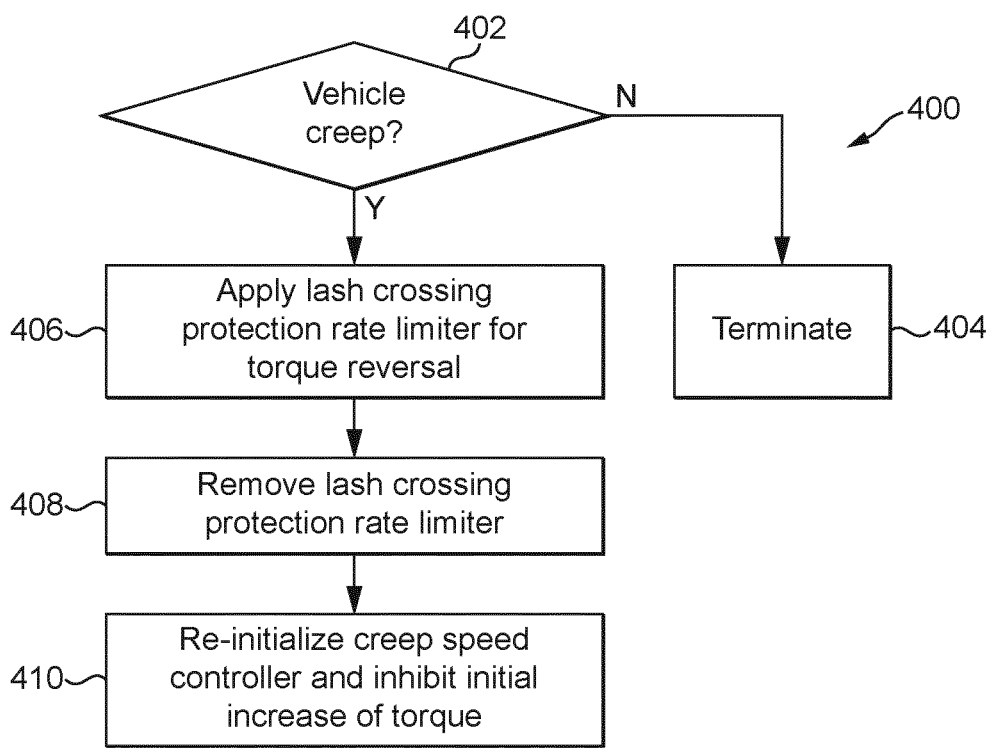
FIG. 4

HYBRID VEHICLE SPEED AND TORQUE CONTROL

TECHNICAL FIELD

The present disclosure relates to a hybrid vehicle control system and method. In particular, but not exclusively it relates to a hybrid vehicle control system and method for controlling vehicle creep.

BACKGROUND

A phenomenon of vehicle creep occurs in vehicles that comprise torque converters in a torque path between a prime mover (torque source) such as an internal combustion engine (engine), and the vehicle wheels. Vehicle creep causes vehicles to move while the torque path is connected, while the engine is idling. Vehicle creep occurs due to the fluid-coupling design of torque converters.

In an electric or hybrid electric vehicle comprising a torque path between an electric traction motor and vehicle wheels, but no torque converter or need to 'idle', a synthetic vehicle creep function could be provided to approximate the vehicle creep that drivers expect. A synthetic vehicle creep function could also be provided in a vehicle with an engine and an automatic transmission such as a dual-clutch automatic transmission, wherein a clutch pack is provided instead of a torque converter.

A reversal of torque direction may occur when entering a vehicle creep condition. For example, when entering vehicle creep from higher vehicle speeds, the torque may switch from negative torque (overrun or braking) to positive torque (to maintain minimum idle speed/creep speed). If vehicle speed increases during vehicle creep, for example due to a downhill gradient, the vehicle creep torque would become negative to maintain the idle speed/creep speed. If a vehicle is brought to rest by friction brakes, and then the friction brakes are released, the torque may switch from negative to positive.

The reversal of torque direction associated with vehicle creep may cause a lash crossing event which can impart jerk on vehicle occupants and a perceptible torque shock. A lash crossing event is defined as a backlash resulting from the reversal of torque direction. Backlash is caused by the reversal of rotation direction taking up any lost motion in a mechanism such as a driveline providing the torque path. Lash crossing events are most perceptible when the vehicle is in-gear, because lost motions of every component in the torque path(s) are combined. Therefore, vehicle creep is associated with perceptible lash crossing events.

SUMMARY OF THE INVENTION

It is an aim of the present invention to address one or more disadvantages associated with the prior art, to improve vehicle occupant comfort, and to improve durability.

Aspects and embodiments of the invention provide a control system, a vehicle, a method, and computer software, as claimed in the appended claims.

According to an aspect of the invention there is provided a control system for controlling an electric traction motor of a vehicle, the control system comprising one or more controllers, wherein the control system is configured to: limit a rate of change of torque requested from the electric traction motor for changing speed towards a speed target, in dependence on a lash crossing protection rate limiter; and upon removal of the limit prior to the speed reaching the speed target, inhibit (i.e. reduce or prevent) initial increase of a torque requested from the electric traction motor for changing speed towards the speed target.

An advantage is improved vehicle comfort and durability, because jerk is reduced during a torque reversal instructed by a speed controller. Firstly, jerk is reduced because of the lash crossing protection rate limiter. Secondly, jerk is reduced because the torque is inhibited from sharply increasing upon re-initialisation of the speed controller following removal of the lash crossing protection rate limiter.

The control system may be configured to inhibit initial increase of the torque by controlling an integrator torque of a control method (the speed controller). An advantage is further improved vehicle comfort after removal of the rate limiter, by compensating for a tendency of the integrator torque to wind up significantly while the rate limiter is applied.

The control system may be configured to inhibit initial increase of the torque by reducing the integrator torque to at least partially cancel wind-up of the integrator torque. An advantage is that the additional wind-up as an effect of the lash crossing protection rate limiter can be cancelled.

In some examples, the integrator torque of a first torque requested from the electric traction motor following removal of the lash crossing protection rate limiter is reduced. An advantage is that the torque subsequently ramps up smoothly because the integrator torque needs to wind up again.

In some examples, the integrator torque is controlled to reduce or eliminate a step change of the requested torque upon removal of the limit. In some examples, reducing the step change comprises reducing the step change to a magnitude less than 10 Nm.

The control system may be configured to control the torque requested from the electric traction motor after removal of the limit to change speed towards the speed target, using proportional torque and integrator torque and optional derivative torque. An advantage is that the torque ramps up smoothly and quickly because a proportional-integral-derivative (PID) speed controller or PI speed controller regains full control of the torque once the rate limiter has been removed.

The control system may be configured to enable torque requested from the electric traction motor to increase to a rate greater than the limited rate, after removal of the limit and after the inhibiting initial increase. An advantage is that the required speed target can be reached quickly.

The speed target may be a vehicle creep speed target. An advantage is smoother vehicle creep, and smoother transitions to/from vehicle creep.

In some examples, an engine is operable to provide tractive torque to a first set of vehicle wheels, and the electric traction motor is operable to provide tractive torque to a second set of vehicle wheels. In an example, the first set of vehicle wheels are front wheels and the second set of vehicle wheels are rear wheels. In another example, the first set of vehicle wheels are rear wheels and the second set of vehicle wheels are front wheels. An advantage is that four-wheel drive vehicle creep may be possible to implement.

In other examples, the electric traction motor is an engine accessory drive motor generator or a crankshaft integrated motor generator.

According to another aspect of the invention there is provided a vehicle comprising the control system, the engine and the electric traction motor.

According to another aspect of the invention there is provided a method of controlling an engine and an electric traction motor of a vehicle, the method comprising: limiting a rate of change of torque requested from the electric traction motor for changing speed towards a speed target, in dependence on a lash crossing protection rate limiter; and upon removal of the limit prior to the speed reaching the speed target, inhibiting initial increase of a torque requested from the electric traction motor for changing speed towards the speed target.

According to another aspect of the invention there is provided computer software that, when executed, is arranged to perform any one or more of the methods described herein.

According to a further aspect of the invention there is provided a non-transitory computer readable medium comprising computer readable instructions that, when executed by a processor, cause performance of any one or more of the methods described herein.

According to another aspect of the invention there is provided a control system configured to perform any one or more of the methods described herein.

The one or more controllers as described herein may collectively comprise: at least one electronic processor having an electrical input for receiving information indicative of speed and/or the speed target; and at least one electronic memory device electrically coupled to the at least one electronic processor and having instructions stored therein; and wherein the at least one electronic processor is configured to access the at least one memory device and execute the instructions thereon so as to cause the control system to control the electric traction motor in dependence on the information.

According to another aspect of the invention there is provided a control system for controlling an electric traction motor and/or an engine of a vehicle, the control system comprising one or more controllers, wherein the control system is configured to: limit a rate of change of torque requested from the electric traction motor and/or the engine for changing speed towards a speed target, in dependence on a lash crossing protection rate limiter; and upon removal of the limit prior to the speed reaching the speed target, inhibit (i.e. reduce or prevent) initial increase of a torque requested from the electric traction motor for changing speed towards the speed target. In an example, the speed target may be an engine idle speed target.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 3A illustrates an example of a control system and FIG. 3B illustrates an example of a non-transitory computer-readable storage medium;
FIG. 4 illustrates an example of a method.

DETAILED DESCRIPTION

Figure 1:
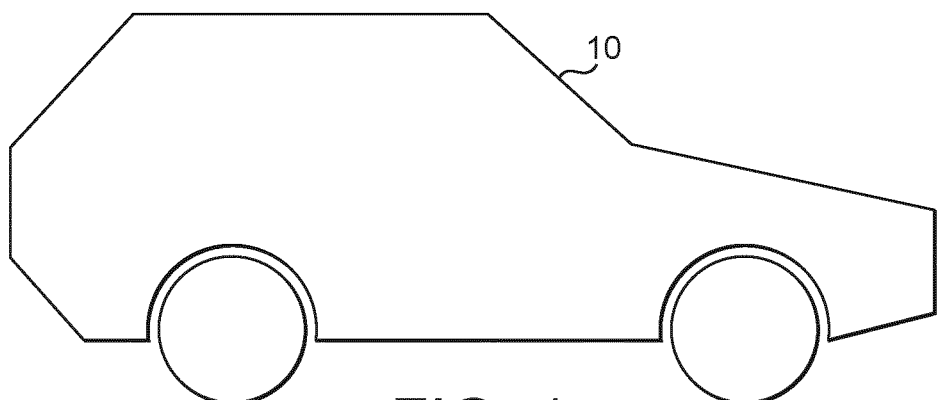
FIG. 1 illustrates an example of a vehicle.

FIG. 1 illustrates an example of a vehicle 10 in which embodiments of the invention can be implemented. In some, but not necessarily all examples, the vehicle 10 is a passenger vehicle, also referred to as a passenger car or as an automobile. In other examples, embodiments of the invention can be implemented for other applications, such as industrial vehicles.

The vehicle 10 may be a hybrid electric vehicle (HEV) having an electric-only mode of propulsion among other modes of propulsion. The HEV may be configured to operate as a parallel HEV. Parallel HEVs comprise a torque path between the engine and at least one vehicle wheel, as well as a torque path between an electric traction motor and at least one vehicle wheel. The torque path(s) may be disconnectable by a torque path connector such as a clutch. Parallel HEVs differ from series HEVs, because in series HEVs the purpose of the engine is to generate electrical energy and there is no torque path between the engine and vehicle wheels.

Figure 2:
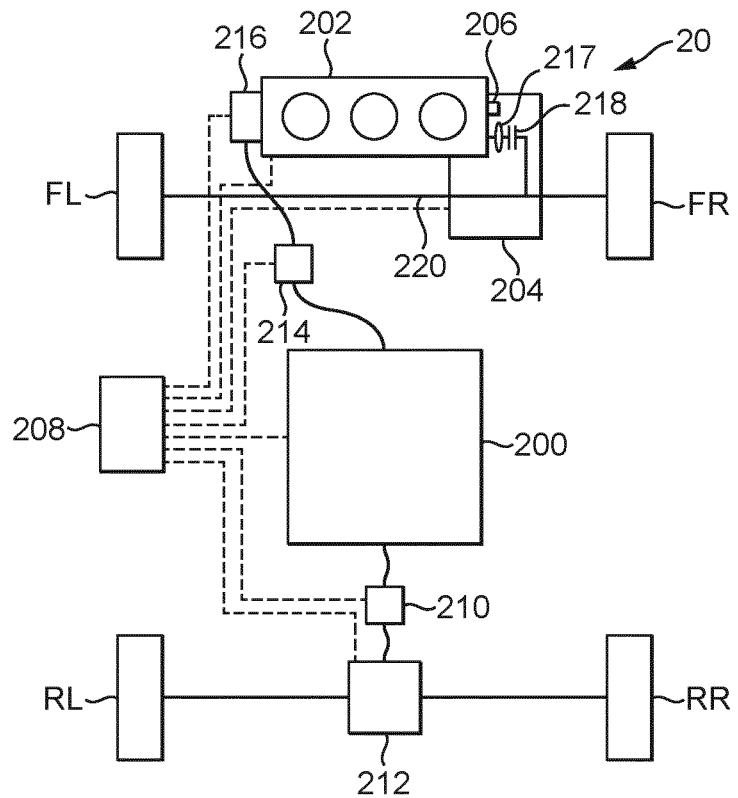
FIG. 2 illustrates an example of a system.

FIG. 2 illustrates a system 20 for a parallel HEV 10. The system 20 defines, at least in part, a powertrain of the HEV.

The system 20 comprises a control system 208. The control system 208 comprises one or more controllers. The control system 208 may comprise one or more of: a hybrid powertrain control module; an engine control unit; a transmission control unit; a traction battery management system; and/or the like.

The system 20 comprises an engine 202. The engine 202 is a combustion engine. The illustrated engine 202 is an internal combustion engine. The illustrated engine 202 comprises three combustion chambers, however a different number of combustion chambers may be provided in other examples.

The engine 202 is operably coupled to the control system 208 to enable the control system 208 to control output torque of the engine 202. The output torque of the engine 202 may be controlled by controlling one or more of: air-fuel ratio; spark timing; poppet valve lift; poppet valve timing; throttle opening position; fuel pressure; turbocharger boost pressure; and/or the like, depending on the type of engine 202.

The system 20 comprises an optional pinion starter 206 for starting the engine 202.

The system 20 comprises a vehicle transmission arrangement 204 for receiving output torque from the engine 202. The vehicle transmission arrangement 204 may comprise an automatic vehicle transmission or a semi-automatic vehicle transmission. The vehicle transmission arrangement 204 comprises a fluid-coupling torque converter 217 between the engine 202 and a gear train.

The system 20 may comprise a differential (not shown) for receiving output torque from the gear train. The differential may be integrated into the vehicle transmission arrangement 204 as a transaxle, or provided separately.

The engine 202 is mechanically connected or connectable to a first set of vehicle wheels (FL, FR) via a torque path 220. The torque path 220 extends from an output of the engine 202 to the vehicle transmission arrangement 204, then to axles/driveshafts, and then to the first set of vehicle wheels (FL, FR). In a vehicle overrun and/or friction braking situation, torque may flow from the first set of vehicle wheels (FL, FR) to the engine 202. Torque flow towards the first set of vehicle wheels (FL, FR) is positive torque, and torque flow from the first set of vehicle wheels (FL, FR) is negative torque.

The illustrated first set of vehicle wheels (FL, FR) comprises front wheels, and the axles are front transverse axles. Therefore, the system 20 is configured for front wheel drive by the engine 202. In another example, the first set of vehicle wheels (FL, FR) comprises rear wheels. The illustrated first set of vehicle wheels (FL, FR) is a pair of vehicle wheels, however a different number of vehicle wheels could be provided in other examples.

In the illustrated system 20, no longitudinal (centre) driveshaft is provided, to make room for hybrid vehicle components. Therefore, the engine 202 is not connectable to a second set of rear wheels (rear wheels RL, RR in the illustration). The engine 202 may be transverse mounted to save space. In an alternative example, the engine 202 may be configured to drive the front and rear wheels.

A torque path connector 218 such as a clutch is provided inside and/or outside a bell housing of the vehicle transmission arrangement 204. The clutch 218 is configured to connect and configured to disconnect the torque path 220 between the engine 202 and the first set of vehicle wheels (FL, FR). The system 20 may be configured to automatically actuate the clutch 218 without user intervention.

The system 20 comprises a first electric traction motor 216. The first electric traction motor 216 may be an alternating current induction motor or a permanent magnet motor, or another type of motor. The first electric traction motor 216 is located to the engine side of the clutch 218.

The first electric traction motor 216 may be mechanically coupled to the engine 202 via a belt or chain. For example, the first electric traction motor 216 may be a belt integrated starter generator. In the illustration, the first electric traction motor 216 is located at an accessory drive end of the engine 202, opposite a vehicle transmission end of the engine 202. In an alternative example, the first electric traction motor 216 is a crankshaft integrated motor generator, located at a vehicle transmission end of the engine 202.

The first electric traction motor 216 is configured to apply positive torque and configured to apply negative torque to a crankshaft of the engine 202, for example to provide functions such as: boosting output torque of the engine 202; deactivating (shutting off) the engine 202 while at a stop or coasting; activating (starting) the engine 202; and regenerative braking in a regeneration mode. In a hybrid electric vehicle mode, the engine 202 and first electric traction motor 216 are both operable to supply positive torque simultaneously to boost output torque. The first electric traction motor 216 may be incapable of sustained electric-only driving.

However, when the torque path 220 between the engine 202 and the first set of vehicle wheels (FL, FR) is disconnected, a torque path 220 between the first electric traction motor 216 and the first set of vehicle wheels (FL, FR) is also disconnected.

FIG. 2 illustrates a second electric traction motor 212 configured to enable at least an electric vehicle mode comprising electric-only driving. In some, but not necessarily all examples, a nominal maximum torque of the second electric traction motor 212 is greater than a nominal maximum torque of the first electric traction motor 216.

Even if the torque path 220 between the engine 202 and the first set of vehicle wheels (FL, FR) is disconnected by the clutch 218, the vehicle 10 can be driven in electric vehicle mode because the second electric traction motor 212 is connected to at least one vehicle wheel.

The illustrated second electric traction motor 212 is configured to provide torque to the illustrated second set of vehicle wheels (RL, RR). The second set of vehicle wheels (RL, RR) comprises vehicle wheels not from the first set of vehicle wheels (FL, FR). The illustrated second set of vehicle wheels (RL, RR) comprises rear wheels, and the second electric traction motor 212 is operable to provide torque to the rear wheels RL, RR via rear transverse axles. Therefore, the vehicle 10 is rear wheel driven in electric vehicle mode. In an alternative example, the second set of vehicle wheels comprises at least one vehicle wheel of the first set of vehicle wheels.

The control system 208 may be configured to disconnect the torque path 220 between the engine 202 and the first set of vehicle wheels (FL, FR) in electric vehicle mode, to reduce parasitic pumping energy losses. For example, the clutch 218 may be opened. In the example of FIG. 2, this means that the first electric traction motor 216 will also be disconnected from the first set of vehicle wheels (FL, FR).

Another benefit of the second electric traction motor 212 is that the second electric traction motor 212 may also be configured to operable in a hybrid electric vehicle mode, to enable four-wheel drive operation despite the absence of a centre driveshaft.

In order to store electrical power for the electric traction motors, the system 20 comprises a traction battery 200. The traction battery 200 provides a nominal voltage required by electrical power users such as the electric traction motors. If the electric traction motors run at different voltages, DC-DC converters (not shown) or the like may be provided to convert voltages.

The traction battery 200 may be a high voltage battery. High voltage traction batteries provide nominal voltages in the hundreds of volts, as opposed to traction batteries for mild HEVs which provide nominal voltages in the tens of volts. The traction battery 200 may have a voltage and capacity to support electric only driving for sustained distances. The traction battery 200 may have a capacity of several kilowatt-hours, to maximise range. The capacity may be in the tens of kilowatt-hours, or even over a hundred kilowatt-hours.

Although the traction battery 200 is illustrated as one entity, the function of the traction battery 200 could be implemented using a plurality of small traction batteries in different locations on the vehicle 10.

In some examples, the first electric traction motor 216 and second electric traction motor 212 may be configured to receive electrical energy from the same traction battery 200. By pairing the first (mild) electric traction motor 216 to a high-capacity battery (tens to hundreds of kilowatt-hours), the first electric traction motor 216 may be able to provide the functionality of the methods described herein for sustained periods of time, rather than for short bursts. In another example, the electric traction motors 212, 216 may be paired to different traction batteries.

Finally, the illustrated system 20 comprises inverters. Two inverters 210, 214 are shown, one for each electric traction motor.

In other examples, one inverter or more than two inverters could be provided.

In an alternative implementation, the vehicle 10 may be other than shown in FIG. 2.

FIG. 3A illustrates how the control system 208 may be implemented. The control system 208 of FIG. 3A illustrates a controller 300. In other examples, the control system 208 may comprise a plurality of controllers on-board and/or off-board the vehicle 10.

The controller 300 of FIG. 3A includes at least one electronic processor 302; and at least one electronic memory device 304 electrically coupled to the electronic processor 302 and having instructions 306 (e.g. a computer program) stored therein, the at least one electronic memory device 304 and the instructions 306 configured to, with the at least one electronic processor 302, cause any one or more of the methods described herein to be performed.

FIG. 3B illustrates a non-transitory computer-readable storage medium 308 comprising the instructions 306 (computer software).

The control system 208 may be configured to provide controller outputs to manipulate a variable (torque) towards a setpoint. An example setpoint is at least one torque target. The at least one torque target may be normally based on torque demand such as driver torque demand (e.g. accelerator pedal depression, APD), an autonomous driving torque demand, or a cruise control torque demand. The at least one torque target may normally be proportional to torque demand. The torque target may comprise an engine torque target for controlling output torque of the engine. The torque target may comprise an electric traction motor torque target for controlling output torque of an electric traction motor.

Another example setpoint is a speed target. Speed targets may comprise an engine speed target such as an engine idle speed target, a vehicle speed target, or an electric traction motor speed target. Torque from the engine and/or an electric traction motor torque may be controlled to match speed to the speed target, used during idling, vehicle creep, cruise control or other scenarios.

A system 20 such as the powertrain of FIG. 2 may be operable in a plurality of modes. In one mode, the engine 202 is deactivated and the torque path 220 between the engine 202 and the first set of vehicle wheels (FL, FR) is disconnected. The mode may be the electric vehicle mode. In another mode, the engine 202 is re-activated and the torque path 220 is re-connected. The other mode may be the hybrid electric vehicle mode or an engine-only mode.

The vehicle 10 may be configured to creep in one or more of the above modes. In the electric vehicle mode, the second electric traction motor 212 may implement a synthetic vehicle creep function. The synthetic vehicle creep may depend on a vehicle speed target. In the hybrid electric vehicle mode, the second electric traction motor 212 and the engine 202 may together implement four-wheel drive vehicle creep. In some examples, the first electric traction motor 216 may be employed to, at least in part, control engine speed. In the hybrid electric vehicle mode or the engine-only mode, the torque converter 217 may cause vehicle creep when the automatic vehicle transmission is in-gear. The creep speed depends, among other things, on an engine idle speed target which may be constant or variable.

Depending on which mode the vehicle 10 is in or which mode is available, creep speed is dependent, at least in part, on some form of speed control. The speed control may correspond to an engine idle speed controller that affects creep speed, or a vehicle creep speed controller for synthetic vehicle creep.

FIG. 4 illustrates a method 400 according to an aspect of the invention, implemented by the control system 208. The method 400 comprises, in a vehicle creep situation:

limiting a rate of change of torque requested from the electric traction motor (212 or 216) for changing speed towards a speed target, in dependence on a lash crossing protection rate limiter (block 406); and upon removal of the limit prior to the speed reaching the speed target, inhibiting initial increase of a torque requested from the electric traction motor for changing speed towards the speed target (blocks 408, 410).

At block 402, the method 400 comprises determining whether the vehicle 10 is in or is entering a vehicle creep condition. Satisfaction of the vehicle creep condition may require at least a below-threshold APD, such as zero APD. Satisfaction of the vehicle creep condition may require the torque path 220 between the engine 202 and vehicle wheels to be connected (e.g. check vehicle transmission arrangement 204 is in-gear and/or check clutch 218 is closed), and/or may require a torque path between the second electric traction motor 212 and vehicle wheels to be connected. Satisfaction of the vehicle creep condition may require a below-threshold vehicle speed. Satisfaction of the vehicle creep condition may depend on whether a user has enabled a vehicle creep function.

If the vehicle creep condition is not satisfied, the method 400 terminates at block 404. If the vehicle creep condition is satisfied, the control system 208 implements the vehicle creep function configured to carry out the method 400 described herein.

When active, the vehicle creep function causes the control system 208 to act as a speed controller. The control system 208 obtains a speed target (setpoint). The speed target may be an engine idle speed target, if the engine 202 is providing the vehicle creep. The speed target may be a vehicle creep speed target, for a synthetic creep function using the second electric traction motor 212. The control system 208 determines a difference (speed error) between feedback speed and the speed target. The control system 208 outputs a torque request as a function of the speed error. The function may be based on pre-calibration.

In an implementation, the speed error is processed using a PI/PID controller. The current value of the speed error is used to calculate the proportional torque. Past values of the speed error may accumulate for calculating the integrator torque. A rate of change of the speed error is used to calculate the derivative torque. The final torque request may be a sum of the proportional, integrator and derivative torques, wherein each of the torques may be weighted differently.

Upon satisfaction of the vehicle creep condition, the method 400 proceeds to block 406. Block 406 comprises applying a lash crossing protection rate limiter when a torque reversal occurs. The lash crossing protection rate limiter limits a rate of change of the controller output (torque request), for example by saturating the torque request where required to ensure that the rate of change of the torque request is no higher than a predetermined rate.

The lash crossing protection rate limiter may be applied (active) when torque in the relevant torque path is detected or is predicted to be within a predetermined range. The endpoints of the predetermined range may be a negative torque and a positive torque, so that a zero-crossing of torque occurs between the endpoints.

The endpoints of the range should not be so wide that the speed controller is substantially slowed, because the settling time would increase significantly.

At block 408, the method 400 comprises removing the lash crossing protection rate limiter once the torque is outside the range. The speed may not have reached the speed target yet, so the control system 208 may continue to output a torque request.

Figure 5:
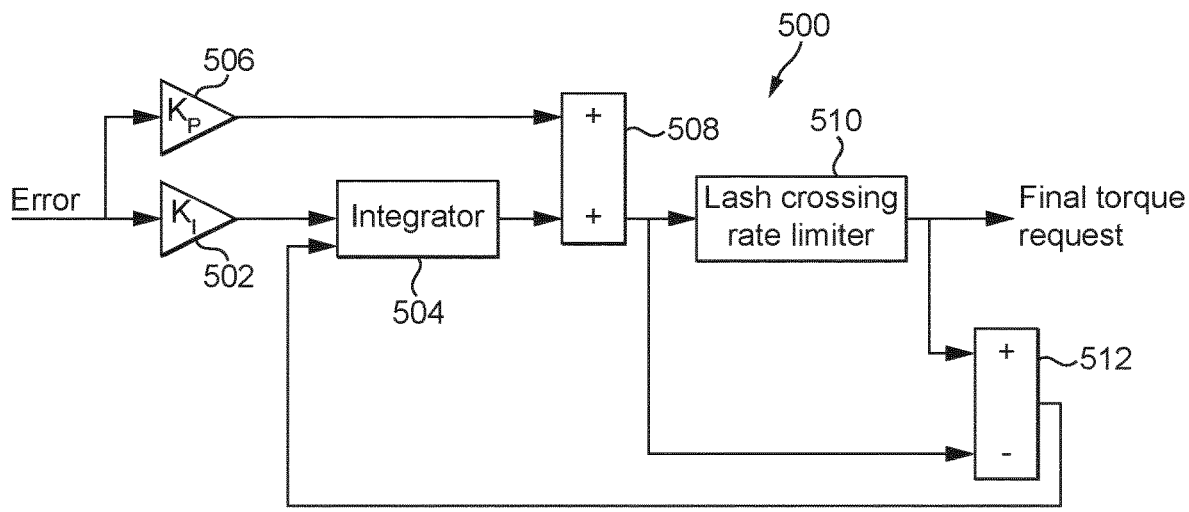
FIG. 5 illustrates a block diagram of an example speed controller.
Figure 6A:
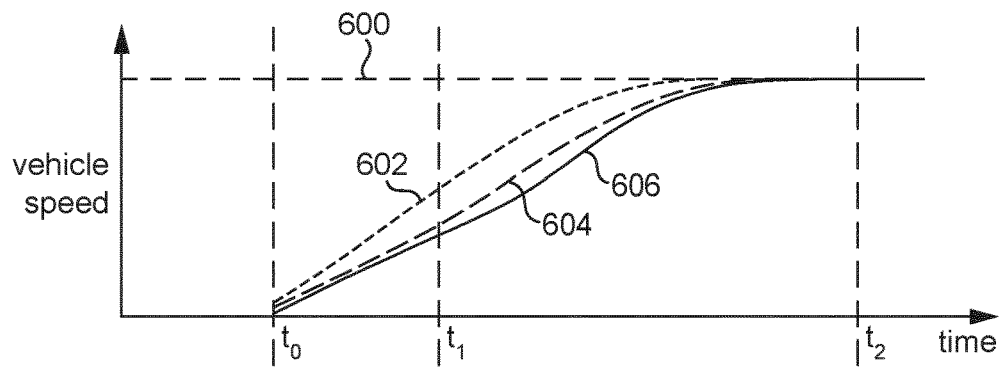
FIG. 6A illustrates an example of a graph with vehicle speed and time axes.
Figure 6B:
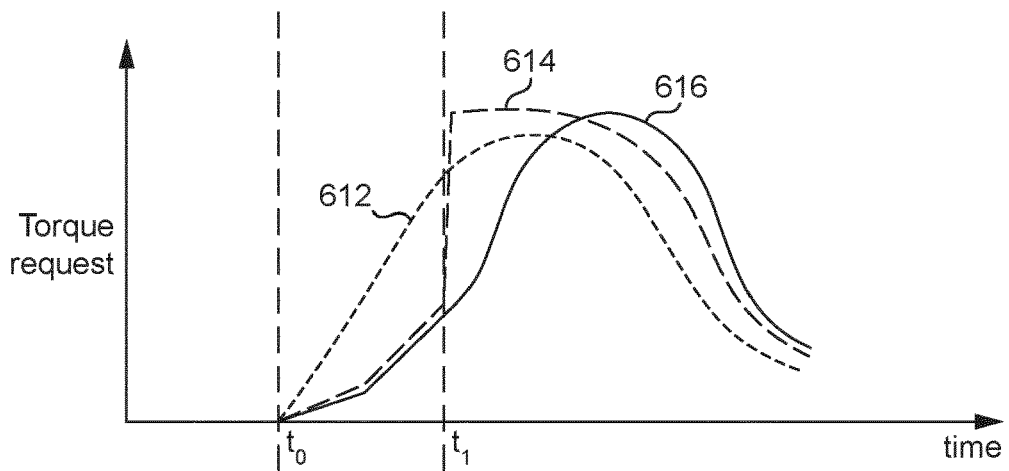
FIG. 6B illustrates an example of a graph with torque request and time axes.

At block 410, the method 400 comprises inhibiting initial increase of the torque request. This is because the first value of the torque request after removal of the rate limiter may otherwise be significantly higher than the immediately preceding value of the torque request while the rate limiter was applied, which could create a torque shock. FIGS. 5, 6A and 6B illustrate the effect of block 410 according to an example PID-controller implementation.

FIG. 5 is a block diagram of a PI/PID (proportional, integrative and derivative) speed controller 500 (derivative blocks not shown) implementing the method 400. The speed controller 500 may be a function of the above-described instructions 306 of the control system 208. The above-defined speed error is input into the controller 500.

The proportional torque weighting block (Kp) 506 weights the speed error and outputs a weighted proportional torque proportional to the speed error.

The integrator torque weighting block (Ki) 502 weights the speed error and outputs the weighted error to the integrator block 504 which calculates a weighted integrator torque based on the accumulated speed error. The weighting gains applied by the integrator torque weighting block 502 and by the proportional torque weighting block 506 may be different, based on calibration.

An addition block 508 calculates a torque request, based on the sum of the weighted proportional torque and the weighted integrator torque.

A lash crossing protection rate limiter block 510 saturates the torque request as described above, if the torque request is within the predetermined range.

A feedback block 512 implements block 410 of the method 400, and is used for the first value of the torque request corresponding to a first time step following removal of the rate limiter block 510. The feedback block 512 receives two torque requests, described below.

Firstly, the feedback block 512 receives the (pre-limited) torque request that is output by the addition block 508 for input into the rate limiter block 510.

Secondly, the feedback block 512 receives the limited (final) torque request that was output by the limiter block 510 at the previous time step, or that would have been output by the limiter block 510 at the current time step if the limiter block 510 were active.

The feedback block 512 subtracts the pre-limited torque request from the limited torque request. The feedback block 512 feeds back the result of the subtraction to the integrator block 504 which subtracts the result from the integrator torque.

This subtractive feedback causes the integrator torque to decrease. Depending on implementation, the amount of decrease causes the final torque request to be equal to the final torque request of the previous time step, or to lie on the same gradient as the final torque requests of previous time steps while the rate limiter block 510 was still active. Therefore, the feedback block 512 may be summarised as inhibiting (reducing or preventing) initial increase of a torque requested by the speed controller, upon removal of the limit imposed by the lash crossing protection rate limiter.

The subtractive feedback cancels most of the wind-up of the integrator torque that occurred while the rate limiter block 510 was active. As stated earlier, one of the side effects of a rate limiter is that high integrator wind-up occurs, which without the subtractive feedback would have caused an immediate discontinuity in the torque request as soon as the rate limiter is removed. As a result of the subtractive feedback, the initial value of the final torque request after removal of the rate limiter starts on or near the gradient of the rate limiter and then smoothly increases as the integrator torque winds up again.

In another implementation, the calculation by the feedback block 512 may be modified to inhibit (reduce) the integrator torque by a lesser extent than described above, as long as the step/discontinuity of the final torque request is less than what would otherwise have occurred without the feedback block 512 (see FIG. 6B, 614, described later). The step may be less than 10 Nm.

In the above example, the feedback block 512 reduces the integrator torque. In another implementation, the feedback block 512 result may be fed back to the proportional torque and/or the derivative torque although this may have less effect than integrator torque feedback. In a further variation, the feedback block 512 may be replaced with an open loop reducer of the final torque request.

The above example is a PI/PID controller. In other examples, the concept of inhibiting initial increase of the torque may be applied to another controller architecture.

FIGS. 6A and 6B illustrate graphs of vehicle speed and the (final) torque request according to comparative examples. The comparative examples include: the speed controller without a lash crossing protection rate limiter (short-dashed lines 602, 612); the speed controller with the lash crossing protection rate limiter but no feedback for reducing the integrator torque (long-dashed lines 604, 614); and the speed controller with the lash crossing protection rate limiter and the feedback as shown in FIG. 5 (solid lines 606, 616).

Between the marked times t0 and t1, the torque request is in a range associated with torque reversal (lash crossing). Between the times t1 and t2, the lash crossing protection rate limiter is not active and the speed is still increasing towards the speed target. At time t2, the speed target is reached.

FIG. 6A illustrates in the y-axis the magnitude of a manipulated variable (vehicle speed), against time in the x-axis. The speed target is marked with a straight dashed line 600.

The short-dashed line 602 shows that without any lash crossing protection, the vehicle speed increases most quickly to the target, but a backlash may be felt.

The long-dashed line 604 shows that with lash crossing protection only, the vehicle speed increases slowly through the torque reversal region t0-t1, but the gradient suddenly increases at time t1 when the limit is removed, due to a discontinuity in the torque request. The gradient change corresponds to a vehicle jerk that may disturb vehicle occupants and create a torque shock. The vehicle speed takes slightly longer to reach the speed target than the curve 602.

The solid line 606 shows that with the PI/PID controller of FIG. 5, the vehicle speed increases at the same rate as the line 604 through the torque-reversal, and there is no jerk at time t1. The vehicle speed may take slightly longer to reach the speed target than the curves 602 and 604.

FIG. 6B illustrates in the y-axis the magnitude of the torque request against time in the x-axis. The time axis is aligned with the time axis of FIG. 6A.

The short-dashed line 612 indicates the torque associated with the speed line 602, and shows that without any lash crossing protection, the torque increases at a high rate through the torque reversal, which can cause backlash and a corresponding torque shock/jerk.

The long-dashed line 614 indicates the torque associated with the speed line 604, and shows that with lash crossing protection only, the torque increases at a lower rate through the torque reversal. A torque discontinuity exists at time t1 as a result of the wound-up integrator torque, upon removal of the rate limiter.

In the illustration, the line 614 also shows that the lash crossing protection rate limiter comprises a first lower rate limit up to a first threshold, and a second higher rate limit between the first threshold and a second higher threshold. This provides a good compromise between controller responsiveness and lash crossing performance. In other implementations, the lash crossing rate limiter may comprise more than two rates, or may comprise one rate only.

The solid line 616 indicates the torque associated with the speed line 606, and shows that with the PI/PID controller of FIG. 5, the torque increases at the same rate as the line 614 through the torque-reversal, and there is no discontinuity at time t1. The initial rate of increase of the torque after removal of the limit is no greater than the rate as limited before the time t1, and the rate of increase of the torque is allowed to subsequently build up.

For purposes of this disclosure, it is to be understood that the controller(s) 300 described herein can each comprise a control unit or computational device having one or more electronic processors 302. A vehicle 10 and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on one or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

It will be appreciated that various changes and modifications can be made to the present invention without departing from the scope of the present application.

Each passage described as an 'aspect of the invention' is a self-contained statement suitable for a current or future independent claim, with no additional features required.

The blocks illustrated in FIG. 4 may represent steps in a method and/or sections of code in the computer program 306. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed. For example, the examples may be applied to other non-creep speed control use cases such as cruise control.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A control system for controlling an electric traction motor of a vehicle, the control system comprising one or more controllers, wherein the control system is configured to:
   limit a rate of change of torque requested from the electric traction motor for changing speed towards a speed target, in dependence on a lash crossing protection rate limiter; and
   upon removal of the limit prior to the speed reaching the speed target, inhibit initial increase of a torque requested from the electric traction motor for changing speed towards the speed target by controlling an integrator torque of a control method.

2. The control system of claim 1, wherein the one or more controllers collectively comprise:
   at least one electronic processor having an electrical input for receiving information indicative of speed and/or the speed target; and
   at least one electronic memory device electrically coupled to the at least one electronic processor and having instructions stored therein;
   wherein the at least one electronic processor is configured to access the at least one memory device and execute the instructions thereon so as to cause the control system to control the electric traction motor in dependence on the information.

3. The control system of claim 1, configured to inhibit the initial increase of the torque by reducing the integrator torque to at least partially cancel wind-up of the integrator torque.

4. The control system of claim 3, wherein the integrator torque of a first torque requested from the electric traction motor following removal of the lash crossing protection rate limiter is reduced.

5. The control system of claim 1, wherein the integrator torque is controlled to reduce or eliminate a step change of the requested torque upon removal of the limit.

6. The control system of claim 5, wherein reducing the step change comprises reducing the step change to a magnitude less than 10 Nm.

7. The control system of claim 1, configured to control the torque requested from the electric traction motor after removal of the limit to change speed towards the speed target, using proportional torque and integrator torque and optional derivative torque.

8. The control system of claim 1, configured to enable the torque requested from the electric traction motor to increase to a rate greater than the limited rate, after removal of the limit and after the inhibiting initial increase.

9. The control system of claim 1, wherein the speed target is a vehicle creep speed target or an engine idle speed target associated with vehicle creep.

10. The control system of claim 1, wherein an engine is operable to provide tractive torque to a first set of vehicle wheels, and wherein the electric traction motor is operable to provide tractive torque to a second set of vehicle wheels.

11. The control system of claim 10, wherein the first set of vehicle wheels are front wheels and the second set of vehicle wheels are rear wheels, or wherein the first set of vehicle wheels are rear wheels and the second set of vehicle wheels are front wheels.

12. The control system of claim 1, wherein the electric traction motor is an engine accessory drive motor generator or a crankshaft integrated motor generator.

13. A vehicle comprising the control system of claim 1.

14. A method of controlling an engine and an electric traction motor of a vehicle, the method comprising:
   limiting a rate of change of torque requested from the electric traction motor for changing speed towards a speed target, in dependence on a lash crossing protection rate limiter; and
   upon removal of the limit prior to the speed reaching the speed target, inhibiting initial increase of a torque requested from the electric traction motor for changing speed towards the speed target by controlling an integrator torque of a control method.

15. A non-transitory, computer-readable medium having stored thereon computer software that, when executed, is arranged to perform the method according to claim 14.

16. A control system for controlling an electric traction motor of a vehicle, the control system comprising one or more controllers, wherein the control system is configured to:
   limit a rate of change of torque requested from the electric traction motor for changing speed towards a speed target, in dependence on use of a lash crossing protection rate limiter that outputs a torque request value for controlling the electric traction motor when output torque for the electric traction motor is within a predetermined range;
   when the output torque for the electric traction motor exits the predetermined range and the speed has yet to reach the speed target, determine a restricted torque request value for controlling the electric traction motor based on an output of the lash crossing protection rate limiter for a previous torque request; and
   control the electric traction motor in accordance with the restricted torque request value by controlling an integrator torque of a control method.

17. The control system of claim 16, wherein the output of the lash crossing protection rate limiter for the previous torque request is used for controlling an integrator torque of a proportional-integral (PI) controller or a proportional-integral-derivative (PID) controller.

18. The control system of claim 16, wherein the control system is configured to, for each of a plurality of time steps, output a final torque request for controlling the electric traction motor, and wherein the final torque request for a given time step is determined as:
   the torque request value when the output torque for the electric traction motor is within the predetermined range; and
   the restricted torque request value when the output torque for the electric traction motor exits the predetermined range.

19. The control system of claim 16, wherein the restricted torque request value for controlling the electric traction motor is determined based on a difference between an input of the lash crossing protection rate limiter for the previous torque request and the output of the lash crossing protection rate limiter for the previous torque request.

* * * * *